United States Patent
Ramasamy et al.

(10) Patent No.: US 11,913,295 B2
(45) Date of Patent: Feb. 27, 2024

(54) SYSTEM AND METHOD FOR PLUGGING A LOST-CIRCULATION ZONE IN A SUBSURFACE FORMATION

(71) Applicant: Saudi Arabian Oil Company, Dhahran (SA)

(72) Inventors: Jothibasu Ramasamy, Dhahran (SA); Chinthaka Gooneratne, Dhahran (SA); Jianhui Xu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 280 days.

(21) Appl. No.: 17/559,544

(22) Filed: Dec. 22, 2021

(65) Prior Publication Data
US 2023/0193705 A1 Jun. 22, 2023

(51) Int. Cl.
*E21B 21/00* (2006.01)
*C09K 8/487* (2006.01)
*C09K 8/42* (2006.01)
*E21B 33/138* (2006.01)

(52) U.S. Cl.
CPC ............ *E21B 21/003* (2013.01); *C09K 8/426* (2013.01); *C09K 8/487* (2013.01); *E21B 33/138* (2013.01)

(58) Field of Classification Search
CPC .. E21B 21/003; E21B 33/138; E21B 17/1078; C09K 8/426; C09K 8/487
See application file for complete search history.

(56) References Cited

U.S. PATENT DOCUMENTS

| | | | |
|---|---|---|---|
| 8,800,880 B2 | 8/2014 | Christiansen | |
| 9,115,573 B2 | 8/2015 | Purkis et al. | |
| 9,488,046 B2 | 11/2016 | Purkis | |
| 10,865,620 B1* | 12/2020 | Ramasamy | ........... E21B 21/003 |
| 11,643,899 B1* | 5/2023 | Ramasamy | ......... E21B 33/1208 166/317 |
| 2006/0102834 A1* | 5/2006 | Mickael | ................... G01V 5/08 250/269.1 |

(Continued)

FOREIGN PATENT DOCUMENTS

| | | |
|---|---|---|
| EP | 1357402 A2 | 10/2003 |
| EP | 1225940 B1 | 2/2007 |

*Primary Examiner* — Shane Bomar
(74) *Attorney, Agent, or Firm* — DINSMORE & SHOHL LLP

(57) ABSTRACT

A method for plugging a lost-circulation zone in a subsurface formation includes introducing a drillstem including a drilling stabilizer into a wellbore during drilling operations, the drilling stabilizer including at least stabilizer blades and a pressure sensor. Each stabilizer blade includes at least an inner chamber, a light source, and a window. The method further includes injecting a lost-circulation fluid, including a plurality of lost-circulation particles, into the wellbore. Each lost-circulation particle includes a lost-circulation additive encapsulated by a photo-sensitive coating. The method further includes measuring a pressure differential with the pressure sensor and providing a pressure signal to the light source of each stabilizer blade, thereby actuating the light source to produce a light beam, which allows the light beam to contact the photo-sensitive coatings of the lost-circulation particles to release the lost-circulation additives. The method further includes allowing the lost-circulation fluid to plug the lost-circulation zone.

20 Claims, 4 Drawing Sheets

(56) References Cited

U.S. PATENT DOCUMENTS

| | | | |
|---|---|---|---|
| 2009/0090514 A1* | 4/2009 | Bailey | E21B 33/138 |
| | | | 118/620 |
| 2012/0076364 A1* | 3/2012 | Tjhang | E21B 47/002 |
| | | | 382/109 |
| 2013/0233568 A1* | 9/2013 | Levie | E21B 17/1078 |
| | | | 166/381 |
| 2016/0237762 A1* | 8/2016 | Khaparde | E21B 17/1078 |
| 2017/0159363 A1 | 6/2017 | Lazarev et al. | |
| 2018/0003001 A1* | 1/2018 | Pipchuk | E21B 33/138 |
| 2019/0031951 A1* | 1/2019 | Johnson | C09K 8/03 |
| 2019/0345822 A1* | 11/2019 | Pfutzner | G01J 3/44 |

* cited by examiner

SYSTEM AND METHOD FOR PLUGGING A LOST-CIRCULATION ZONE IN A SUBSURFACE FORMATION

TECHNICAL FIELD

Embodiments described herein generally relate to subsurface formation drilling tools and methods for applying, and more specifically, to systems and methods for plugging a lost-circulation zone.

BACKGROUND

Extracting hydrocarbons from subsurface formations may require drilling a hole from the surface to the subsurface formation containing the hydrocarbons through a wellbore or borehole. During drilling of a wellbore, lost circulation zones may be encountered which may result in negative events such as loss of fluids, formation fluid kicks, and stuck tools used to drill the well. In a lost circulation zone, fluids, including drilling fluids, flow out of the wellbore and into the surrounding formation. Lost circulation zones may increase the cost of the well through increased material costs to replace lost fluids and downtime to remediate the lost circulation zone.

SUMMARY

Lost circulation zones are traditionally remediated by introducing a lost circulation material into the lost circulation zone to seal or plug off the lost circulation zone to prevent further fluid loss. Common types of lost circulation materials are viscosified substances for plugging the pores of the lost-circulation zone. These substances are typically viscosified at surface and then injected as a "pill." Other methods can include surface actuation of downhole tools through a communicative line present in the wellbore. However, all of these methods have an inherent problem in that they are responsive and require manual input to plug the lost-circulation zone. These methods also require waiting until the lost-circulation zone causes a surface event. One surface event can include a loss or reduction of returned drill cuttings, where the loss of fluid to the lost-circulation zone reduces the remaining fluid's ability to transport drill cuttings, resulting in the drill cuttings falling down the wellbore and not being carried to surface. Another surface event can include observing a faster return rate of circulated fluids at surface. As fluids are lost to the lost-circulation zone, remaining wellbore fluids must flow at a faster rate to maintain the volumetric flow in the wellbore, resulting in a faster return velocity at surface. Both of these events can result in large losses of fluid to the lost-circulation zone before personnel perceive the event and realize something has gone wrong.

Therefore, a need exists for methods and systems that allow for the plugging of a lost-circulation zone shortly after encountering the lost-circulation zone and without manual input or action at surface to plug the lost-circulation zone. The present disclosure addresses this need by providing systems and methods for plugging lost-circulation zones that allow for the plugging of the lost-circulation zone shortly after encountering the lost-circulation zone by exposing photo-sensitive coating encapsulated lost-circulation additives within a lost-circulation fluid to light automatically after a lost-circulation zone causes a pressure differential. The light causes the lost-circulation additives to be released. The lost-circulation additives increase the viscosity of the lost-circulation fluid thereby plugging the lost-circulation zone.

In accordance with one embodiment of the present disclosure, a drilling stabilizer includes a stabilizer body; the stabilizer body including a top end, a bottom end, and an outer sidewall; stabilizer blades spaced apart from each other and attached to and extending radially from the outer sidewall of the stabilizer body, each stabilizer blade including a stabilizer blade body having an inner chamber, a light source positioned within the inner chamber, and a window that is at least partially transparent; and a pressure sensor located on the outer sidewall of the stabilizer body, and wherein the window is positioned on the stabilizer blade body to allow light from the light source to radiate from the light source positioned within the inner chamber through the window; the light source of each stabilizer blade is actuated to generate a light beam when a pressure signal is sent from the pressure sensor; and the light source radiates the light beam through the window of each stabilizer blade when the light source of each stabilizer blade is actuated.

In accordance with another embodiment of the present disclosure, a method of plugging a lost-circulation zone includes introducing a drillstem including a drilling stabilizer into a wellbore during drilling operations, the drilling stabilizer including a drilling stabilizer body, stabilizer blades, and a pressure sensor, and the stabilizer blades each including a stabilizer body having an inner chamber, a light source positioned within the inner chamber, and a window that is at least partially transparent; injecting a lost-circulation fluid into the wellbore, the lost-circulation fluid including a plurality of lost-circulation particles, each of the lost-circulation particles including a lost-circulation additive encapsulated by a photo-sensitive coating; measuring a pressure differential with the pressure sensor; sending a pressure signal to the light source of each stabilizer blade, thereby actuating the light source to produce a light beam; allowing the light beam to radiate outward from the window of each stabilizer blade to contact the photo-sensitive coatings of the plurality of lost-circulation particles, thereby breaking the photo-sensitive coatings and releasing the lost-circulation additives within the lost-circulation fluid; and allowing the lost-circulation fluid to plug the lost-circulation zone.

Additional features and advantages of the described embodiments will be set forth in the detailed description, which follows, and in part will be readily apparent to those skilled in the art from that description or recognized by practicing the described embodiments, including the detailed description, which follows, as well as the claims.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
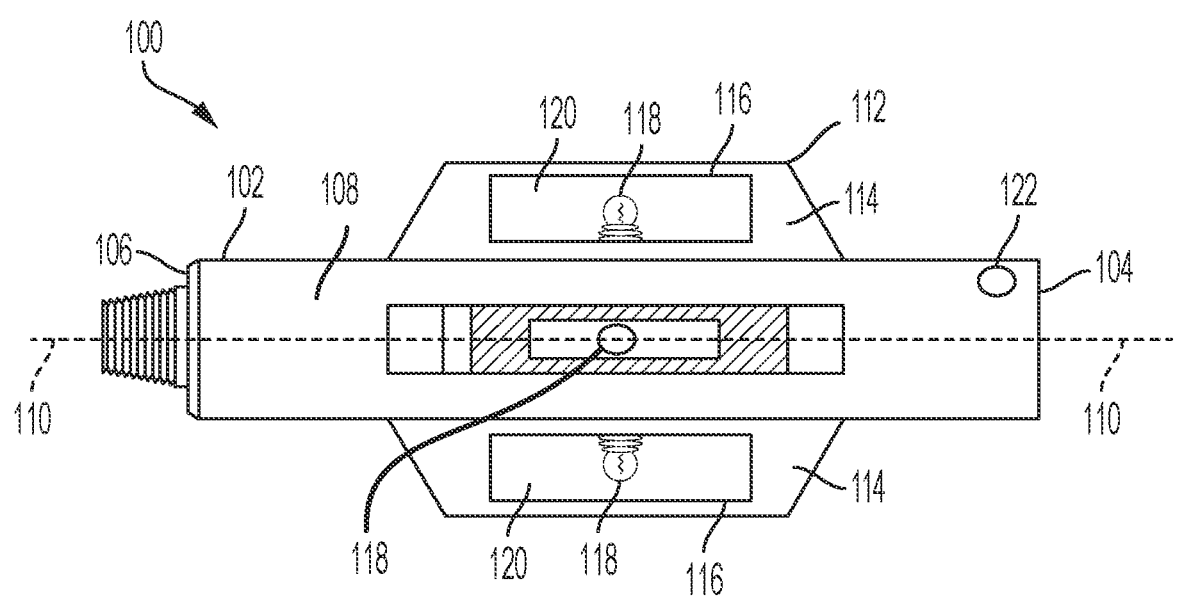
FIG. 1 is an illustrative drawing of a drilling stabilizer according to one or more embodiments shown and described herein.

Embodiments of the present disclosure are directed to a drilling stabilizer for plugging a lost-circulation zone in a subsurface formation and methods for plugging a lost-circulation zone in a subsurface formation.

As described in the present disclosure, a "bottomhole assembly" may refer to the lower portion of a drill stem, including but not limited to, a drill bit, a bit sub, a mud motor, stabilizers, a drill collar, and drill pipe.

As used throughout this disclosure, the terms "downhole" and "uphole" may refer to a position within a wellbore relative to the surface, with uphole indicating direction or position closer to the surface and downhole referring to direction or position farther away from the surface.

As used throughout this disclosure, a "drillstem" may refer to a combination of drill pipe, a bottomhole assembly, and any other tools used to make a drill bit turn at the bottom of a wellbore during drilling operations.

As described in the present disclosure, a "subsurface formation" may refer to a body of rock that is sufficiently distinctive and continuous from the surrounding rock bodies that the body of the rock may be mapped as a distinct entity. A subsurface formation is, therefore, sufficiently homogenous to form a single identifiable unit containing similar properties throughout the subsurface formation, including, but not limited to, porosity and permeability.

As used throughout this disclosure, "transparency" may refer to the qualities of an object that allow light to pass through the object without scattering or reflection. An object being "partially transparent" may mean that some light can pass through the object and that other light cannot pass through the object and is reflected. An object being "fully transparent" may mean that all light can pass through the object and no light is reflected.

As used throughout this disclosure, "wellbore," may refer to a drilled hole or borehole extending from the surface of the Earth down to the subsurface formation, including the openhole or uncased portion. The wellbore may form a pathway capable of permitting fluids to traverse between the surface and the subsurface formation. The wellbore may include at least a portion of a fluid conduit that links the interior of the wellbore to the surface. The fluid conduit connecting the interior of the wellbore to the surface may be capable of permitting regulated fluid flow from the interior of the wellbore to the surface and may permit access between equipment on the surface and the interior of the wellbore.

As used throughout this disclosure, a "wellbore wall" may refer to the interface through which fluid may transition between the subsurface formation and the interior of the wellbore. The wellbore wall may be unlined (that is, bare rock or formation) to permit such interaction with the subsurface formation or lined, such as by a tubular string, so as to prevent such interactions. The wellbore wall may also define the void volume of the wellbore.

Referring initially to FIG. 1, a drilling stabilizer 100 for plugging a lost-circulation zone in a subsurface formation is illustrated. The drilling stabilizer 100 includes a drilling stabilizer body 102, stabilizer blades 112, a light source 118, and a pressure sensor 122. The drilling stabilizer body 102 includes a top end 104, a bottom end 106, and an outer sidewall 108. In embodiments, a central axis 110 may extend from the top end 104 to the bottom end 106. The outer sidewall 108 may be centered about the central axis 110. In embodiments, (not shown) the drilling stabilizer 100 may be part of a drill stem that may also include a drill bit and drill pipe. A "drill bit" may refer to a tool placed at the bottom of a wellbore that, when rotated, cuts or mills the subsurface formation to produce rock from the subsurface formation. The drill bit may have an end suitable for cutting or milling the subsurface formation and an opposite end capable of being connected to another part of the drill stem. In embodiments, (not shown) the drilling stabilizer 100 may be connected to the opposite end of the drill bit by either the top end 104 or the bottom end 106. A "drill pipe" may refer to a length of metal pipe used to transmit fluid from a surface of the wellbore to the bottom of the wellbore through a cavity in the drill pipe. The drill pipe may also be used to transmit force in the form of weight to the drill bit at the bottom of the wellbore to increase the rate at which the drill bit mills the subsurface formation. The drill pipe may have two opposite ends capable of being connected to another part of the drill stem. In embodiments, (not shown) the drilling stabilizer 100 may be connected to one of the two opposite ends of the drill pipe by either the top end 104 or the bottom end 106. In embodiments, (not shown) the drilling stabilizer 100 may be connected to the drill bit by the bottom end 106 and to the drill pipe by the top end 104.

Figure 2:
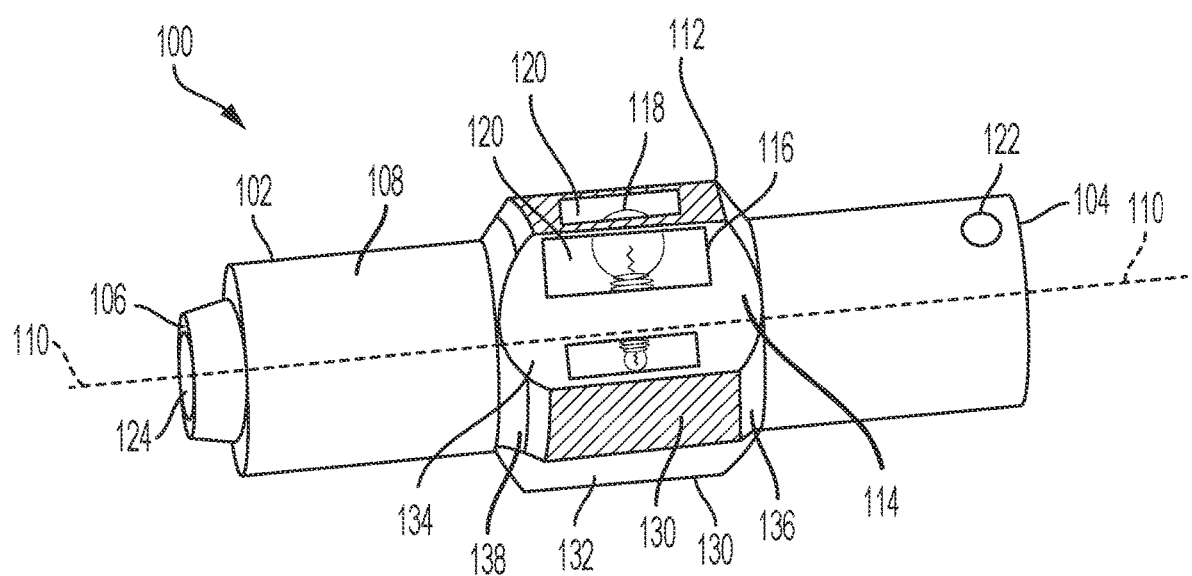
FIG. 2 is an isometric view of a drilling stabilizer according to one or more embodiments shown and described herein.

Now referring to FIG. 2, an isometric view of the drilling stabilizer 100 according to one or more embodiments described herein is illustrated. In embodiments, the drilling stabilizer 100 may further include an inner sidewall 124. The inner sidewall 124 of the stabilizer body 102 may be operable to transmit fluid from the top end 104 to the bottom end 106 through a cavity defined by the inner sidewall 124. The inner sidewall 124 may be centered about the central axis 110. In embodiments, the inner sidewall 124 and the outer sidewall 108 may both be centered about the central axis 110. In these embodiments, the inner sidewall 124 and the outer sidewall 108 may be parallel to one another.

Figure 3:
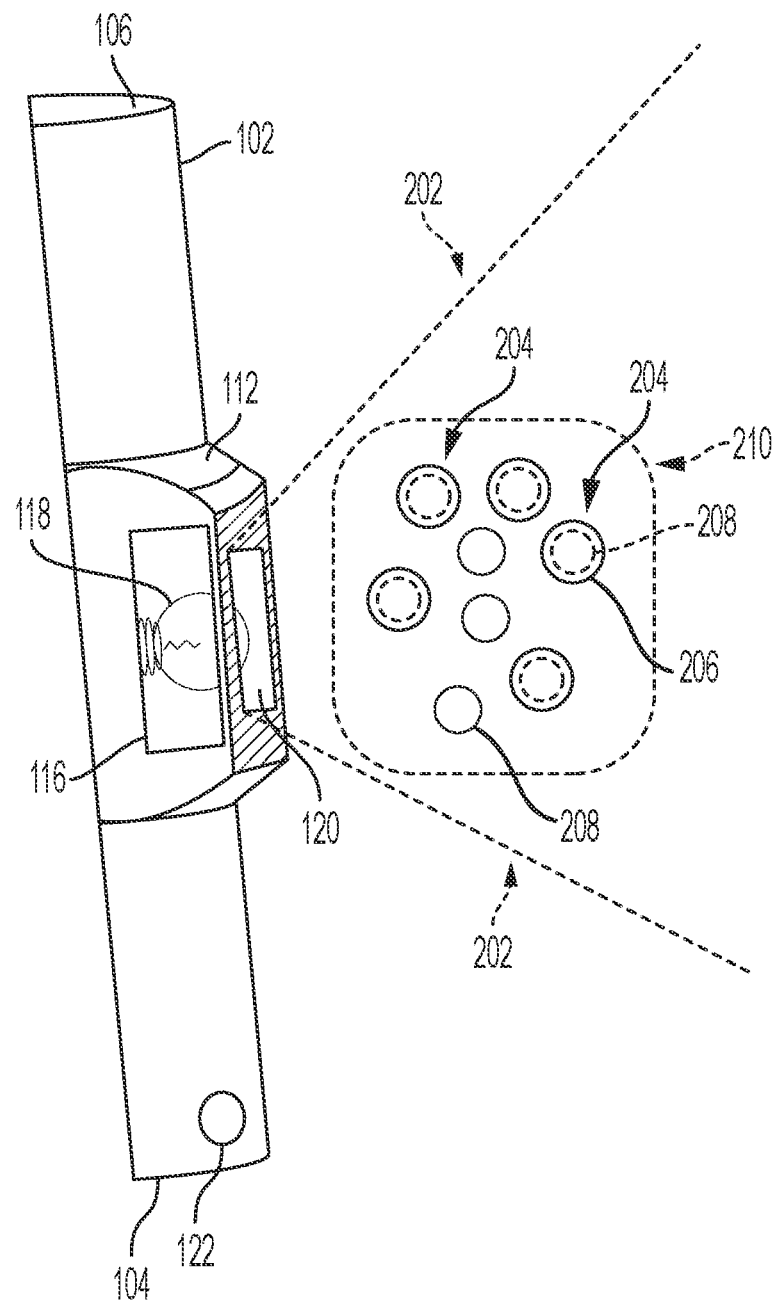
FIG. 3 is an illustration of a light beam from a light source of a drilling stabilizer contacting a plurality of lost-circulation particles, according to one or more embodiments shown and described herein.
Figure 4:
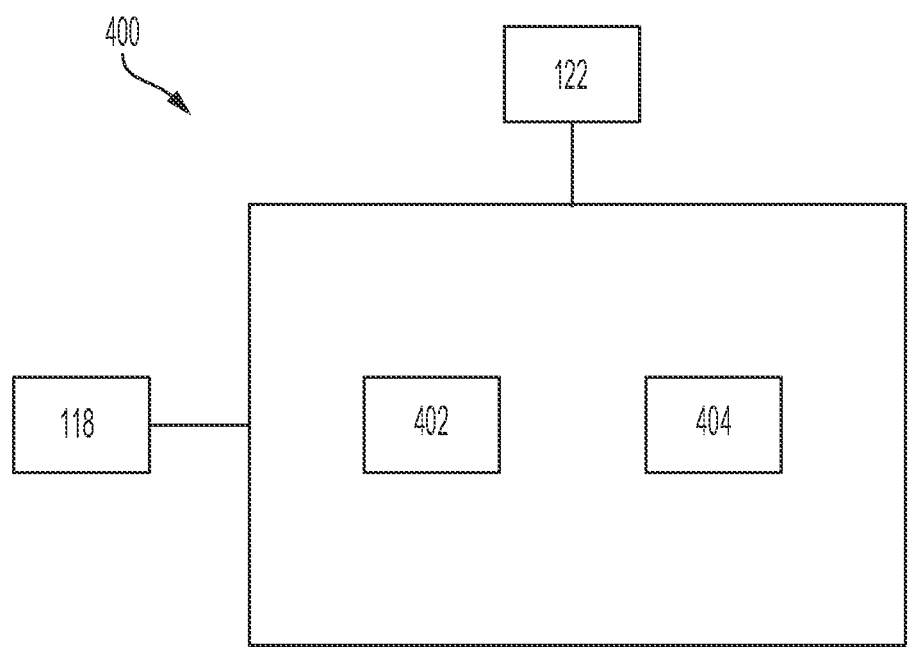
FIG. 4 is an illustration of a control unit for a drilling stabilizer according to one or more embodiments shown and described herein.

As stated previously, and as shown in FIGS. 1 and 2, the drilling stabilizer 100 includes stabilizer blades 112. The stabilizer blades 112 are spaced apart from each other and are attached to the outer sidewall 108 and extend radially from the outer sidewall 108. In embodiments, the drilling stabilizer 100 may include one stabilizer blade 112 (as shown in FIG. 3), two stabilizer blades 112 (not shown), three stabilizer blades 112 (as visible in FIGS. 1 and 2), or four stabilizer blades 112 (not shown). In embodiments, the stabilizer blades 112 may be equidistantly spaced apart from each other. For example, and not by way of limitation, the drilling stabilizer 100 as shown in FIGS. 1 and 2 may have 4 stabilizer blades 112 where the fourth stabilizer blade 112 is on the other side of the drilling stabilizer 100, such that all 4 stabilizer blades 112 are equidistantly spaced. Alternatively, the stabilizer blades 112 may not be equidistantly spaced and may be spaced at different distances along the circumference (for example, and not by way of limitation, the drilling stabilizer 100 may have 3 stabilizer blades 112 as visible in FIGS. 1 and 2, where there is not a fourth stabilizer blade 112 on the other side of the drilling stabilizer 100, such that the 3 stabilizer blades are not equidistantly spaced. Alternatively, in embodiments (not shown) the drilling stabilizer 100 may have 2 or 3 stabilizer blades 112 equidistantly spaced from each other around a circumference of the drilling stabilizer 100. The drilling stabilizer 100 may include from 1 to 4, from 1 to 3, from 1 to 2, from 2 to 4, from 2 to 3, and from 3 to 4 stabilizer blades 112. The stabilizer blades 112 may function to keep a drill stem, including drill pipe and the drill bit, centered in a wellbore by engaging the face of a wellbore wall.

In embodiments, and as shown in FIGS. 1 and 2, the stabilizer blades 112 may extend straight from the top end 104 to the bottom end 106. Alternatively, (not shown) the stabilizer blades 112 may extend in a helical orientation about the outer sidewall 108 of the stabilizer body 102 from the top end 104 to the bottom end 106. The helical orientation may be at an acute or obtuse angle to the top end 104.

As shown in FIGS. 1 and 2, each stabilizer blade 112 includes a stabilizer blade body 114 having an inner chamber 116, a light source 118 positioned within the inner chamber 116, and a window 120 that is at least partially transparent. In embodiments, the inner chamber 116 of the stabilizer blade body 114 may be capable of blocking transmission of fluids into the inner chamber 116. The inner chamber 116 may prevent fluids from directly touching the light source 118. The inner chamber 116 may be made capable of blocking transmission of fluids into the interior of the inner chamber 116 by welding, chemical bonding, adhesives, or combinations thereof. In embodiments, the light source 118 may be connected to the inner chamber 116. The light source may be connected to the inner chamber by welding, chemical bonding, adhesives, or combinations thereof. As used herein, "welding" may refer to a process where two or more parts are fused together by using high heat. Welding processes may also include a "filler material" that cools to form a joint between the two or more parts to be fused together.

Now referring to FIG. 3, an illustration of a light beam 202 from the light source 118 of the drilling stabilizer 100 contacting a plurality of lost-circulation particles 210 according to one or more embodiments herein is illustrated. As illustrated in FIGS. 1-3, the window 120 is positioned on the stabilizer blade body 114 to allow light from the light source 118 to radiate from the light source 118 positioned within the inner chamber 116 through the window 120. As illustrated in FIG. 3, light, in the form of the light beam 202, is generated from the light source 118 of each stabilizer blade 112 when the light source 118 is actuated. The light source 118 is actuated when a pressure signal is sent from a pressure sensor 122 located on the outer sidewall 108. When actuated, the light source 118 radiates the light beam 202 through the window 120 of each stabilizer blade 112. In embodiments, the light beam 202 may radiate outward from the window 120 to contact the plurality of lost-circulation particles 210. Each lost-circulation particle 204 may include a lost-circulation additive 208 encapsulated by a photo-sensitive coating 206. The light beam 202 may also contact the photo-sensitive coatings 206 of the plurality of lost-circulation particles 210, thereby breaking the photo-sensitive coatings 206 and releasing the lost-circulation additives 208.

Referring again to FIG. 2, in embodiments, the stabilizer blade body 114 of drilling stabilizer 100 may include a radial face 130, a leading face 132, a trailing face 134, a top face 136, and a bottom face 138. In embodiments, the window 120 may be positioned on the radial face 130, the leading face 132, the trailing face 134, the top face 136, the bottom face 138, or combinations thereof. In this way, the light source 118 may radiate the light beam through the window 120 positioned on the radial face 130, the leading face 132, the trailing face 134, the top face 136, the bottom face 138, or combinations thereof. In embodiments, the radial face 130 may be parallel to the outer sidewall 108 of the drilling stabilizer body 102.

Now referring to FIGS. 1-3, in embodiments, the pressure sensor may include an absolute pressure sensor, a differential pressure sensor, a gauge pressure sensor, a sealed pressure sensor, bi-directional pressure sensor, a digital pressure sensor, a submersible pressure sensor, or combinations thereof. The absolute pressure sensor may measure the pressure of a fluid on the exterior of the drilling stabilizer 100 against a vacuum (a reference pressure of approximately zero). The differential pressure sensor may measure pressure at two separate points and determine a difference in pressure between the two separate points. The gauge pressure sensor may measure the pressure of a fluid on the exterior of the drilling stabilizer 100 against a reference pressure of atmospheric pressure (14.7 pounds per square inch (psi)). The sealed pressure sensor may measure the pressure of a fluid on the exterior of the drilling stabilizer 100 against a chosen reference pressure. In embodiments, the submersible pressure sensor may be a piezoresistive sensor capable of measuring pressure and depth and level of liquids.

Still referring to FIGS. 1-3, in embodiments, each light beam 202 generated by the light sources 118 may have a wavelength from 1 nm to 700 nm. In embodiments, each light beam 202 generated by the light sources 118 may have a different wavelength from 1 nm to 700 nm. The wavelength may also be from 1 nm to 700 nm, from 1 nm to 600 nm, from 1 nm to 500 nm, 1 nm to 400 nm, from 1 nm to 300 nm, from 1 nm to 200 nm, from 1 nm to 100 nm, from 10 to 500 nm, from 10 to 400 nm, from 10 to 300 nm, from 10 to 200 nm, from 10 to 100 nm, from 100 nm to 700 nm, 100 nm to 600 nm, from 100 nm to 500 nm, 100 nm to 400 nm, from 100 nm to 300 nm, from 100 nm to 200 nm, from 200 nm to 700 nm, 200 nm to 600 nm, from 200 nm to 500 nm, 200 nm to 400 nm, from 200 nm to 300 nm, from 300 nm to 700 nm, 300 nm to 600 nm, from 300 nm to 500 nm, 300 nm to 400 nm, from 400 nm to 700 nm, 400 nm to 600 nm, from 400 nm to 500 nm, from 500 nm to 700 nm, 500 nm to 600 nm, or from 600 nm to 700 nm. The wavelength range of 1 nm to 400 nm may be ultraviolet light. The wavelength range of 400 nm to 700 nm may be the visible light spectrum.

Now referring to FIGS. 1-4, in embodiments, the drilling stabilizer 100 may further include a control unit 400. The control unit 400 may be communicatively coupled to the pressure sensor 122, the light source 118, or both. Although the control unit 400 is described as being a single control unit, the use of multiple light sources and control units to perform the functions described herein is contemplated. The control unit 400 includes a processor 402 communicatively coupled to a memory 404. The control unit 400 may be located on the outer sidewall 108. The control unit 400 may also be located on any other part of the drilling stabilizer 100. Moreover, the several components of the control unit 400 may be distributed among the previously mentioned locations.

In embodiments, the processor 402 may include any processing component(s), such as a central processing unit or the like, configured to receive and execute computer readable and executable instructions stored in, for example, the memory 404. In embodiments, the computer readable and executable instructions for actuating the light source 118 may be stored in the memory 404 of the control unit 400. The memory 404 may be configured as, for example and without limitation, volatile memory, nonvolatile memory, or both, and, as such, may include random access memory (including SRAM, DRAM, other types of random access memory, or a combination thereof), flash memory, registers, compact discs, digital versatile discs, other storage components, or combinations thereof.

In embodiments, the control unit 400 may be configured to receive a pressure differential from the pressure sensor 122. The control unit may be configured to provide the pressure differential to the processor 402. The processor 402 may be configured to transform the pressure differential into the pressure signal. The processor 402 may be configured to provide the pressure signal to the light source 118. In embodiments, the light source 118 may be actuated by the pressure signal provided from the processor 402.

In embodiments, it is contemplated that the system could be used to remedy other downhole issues such as, but not limited to, shale stability or friction reduction. For example, and not by way of limitation, the photo-sensitive coating 206 may encapsulate friction reducer additives that, when released, reduce friction losses associated with pumping a fluid. In the previous example, the friction losses may be associated with turbulence of fluid flow. In another example, and not by way of limitation, the photo-sensitive coating 206 may encapsulate clay control additives that, when released, limit clay swelling of a subsurface formation. In the previous example, it is contemplated that the trigger for actuation of the light source 118 may be a signal received from a sensor that measures water salinity.

Referring to FIGS. 1-4, embodiments of the present disclosure also include methods for plugging a lost-circulation zone in a subsurface formation. The method includes the initial step of introducing a drillstem into a wellbore during drilling operations where the drillstem includes the drilling stabilizer 100 as previously described. In embodiments, the drillstem may include multiple drilling stabilizers 100. In embodiments, the drilling stabilizer 100 of the method may be any of the drilling stabilizers 100 of the system previously described. In embodiments, the pressure sensor 122 may be any of the pressure sensors 122 previously described.

In embodiments, a lost-circulation fluid may then be mixed at a surface of the wellbore. The lost circulation fluid includes a plurality of lost-circulation particles 210. Each of the lost-circulation particles 210 includes a lost-circulation additive 208 encapsulated by a photo-sensitive coating 206. In embodiments, the lost-circulation fluid may further include drilling fluid, epoxy resin, or both. The drilling fluid may be a water-based drilling fluid or an oil-based drilling fluid. In embodiments, the water-based drilling fluid may include an aqueous component. In embodiments, the aqueous component may include fresh water, salt water, brine, municipal water, formation water, produced water, well water, filtered water, distilled water, sea water, or combinations thereof. The brine may include at least one of natural and synthetic brine, such as saturated brine or formate brine. In embodiments, the oil-based drilling fluid may include a hydrocarbon component. In embodiments, the hydrocarbon component may include diesel, kerosene, fuel oil, a crude oil, mineral oil, or combinations thereof. In embodiments, the oil-based drilling fluid may additionally include the aqueous component as previously described.

In embodiments, the lost-circulation additives 208 may include crosslinkers, acrylate polymers, super-absorbent polymers, viscosifiers, or combinations thereof. The crosslinkers may include borate-based crosslinkers, amine-based crosslinkers, zirconium-based crosslinkers, or combinations thereof. The amine-based crosslinkers may include tetraethylene pentamine, diethylene triamine, or both. The acrylate polymers may include polyacrylate acid, ethyl acrylate, butyl acrylate, or combinations thereof. The super-absorbent polymers may include sodium polyacrylate, calcium polyacrylate, zinc polyacrylate, polyacrylamide copolymer, ethylene maleic anhydride, carboxymethylcellulose, or combinations thereof. The viscosifiers may include hydroxypropyl methylcellulose, hydroxypropyl cellulose, xanthan gum, guar, or combinations thereof.

In embodiments, lost-circulation fluids including amine-based crosslinkers as lost-circulation additives 208 may also include epoxy resin. Lost-circulation fluids including crosslinkers, acrylate polymers, super-absorbent polymers, or combinations thereof as lost-circulation additives 208 may also include water-based drilling fluid. In embodiments, the borate-based crosslinker may be borax. As described herein, "borax" may be also known as sodium borate, sodium tetraborate, or disodium tetraborate. Lost-circulation fluids including borax as lost-circulation additives 208 may also include a polyvinyl alcohol, such as a polyvinyl glycol. The polyvinyl glycol may be any of the family of polyvinyl glycols, such as a polyvinyl ethylene glycol. In lost-circulation fluids including both borax and polyvinyl alcohol, the borax may crosslink the polyvinyl alcohol. In embodiments, lost-circulation fluids including polyacrylic acid as lost-circulation additives 208 may also include caustic soda (sodium hydroxide). In lost-circulation fluids including both polyarcylic acid and caustic soda, the caustic soda may interact with the polyacrylic acid to form sodium acrylate. The sodium acrylate may then interact with water to form sodium polyacrylate.

In embodiments, the lost-circulation additives 208 may further include gas-generating agents. Gas-generating agents may include azine compounds, carbonate salts, bicarbonate salts, or combinations thereof. In embodiments where the lost-circulation additives 206 include gas-generating agents, it is contemplated that the gas-generating agents may reduce the viscosity of the lost-circulation fluid. It is also contemplated that reducing the viscosity of the lost-circulation fluid with the gas-generating agents may be used to fix events of stuck pipe, mud cake buildup, and also provides an expandable lost circulation system. In embodiments, the photo-sensitive coating 206 may include photolabile crosslinked polymers, chain scission reaction polymers, photodegradable pendant group polymers, or combinations thereof. The photolabile crosslinked polymers may include azo-compounds, stilbenes, spiropyrans, hydrazones, nitrobenzyl groups with a labile bond chosen from ester, amide, carbonate, or carbamate, and combinations thereof. The chain scission reaction polymers may include poly(methyl methacrylate), polystyrene, polyphthaladehyde, polycarbonate, polyester, isoprene polymers, polyacetal, nylon, cellulose, vinyl, or combinations thereof. The photodegradable pendant group polymers may include cinnamic ester groups, chalcon groups, or combinations thereof.

Following the mixing, the lost-circulation fluid may be injected into the wellbore. In embodiments, the lost-circulation fluid may be injected into the wellbore through the drillstem. Injecting through the drillstem may include injecting through an inner sidewall of the drill stem operable to transmit fluid uphole to downhole through a cavity defined by the inner sidewall.

A pressure differential is measured with the pressure sensor 122. In embodiments, the pressure differential may be caused by a lost-circulation zone event. The lost-circulation zone event may cause the pressure differential by causing the lost-circulation fluid to flow out of the wellbore and into the surrounding subsurface formation. This may cause a pressure loss in an area uphole of the lost-circulation zone. In embodiments, the pressure differential may be measured after the injection of the lost-circulation fluid into the wellbore. The pressure differential may be measured before the injection of the lost-circulation fluid into the wellbore. In embodiments, measuring the pressure differential may include measuring pressure values with pressure sensors 112 located uphole and downhole of the lost-circulation zone. Pressure loss due to the lost-circulation zone may be determined in this manner.

In embodiments, the pressure differential may be from 100 psi to 1000 psi. The pressure differential may also be from 100 psi to 1000 psi, from 100 psi to 900 psi, from 100 psi to 800 psi, from 100 psi to 700 psi, from 100 psi to 600 psi, from 100 psi to 500 psi, from 100 psi to 400 psi, from 100 psi to 300 psi, from 100 psi to 200 psi, 200 psi to 1000 psi, from 200 psi to 900 psi, from 200 psi to 800 psi, from 200 psi to 700 psi, from 200 psi to 600 psi, from 200 psi to 500 psi, from 200 psi to 400 psi, from 200 psi to 300 psi, 300 psi to 1000 psi, from 300 psi to 900 psi, from 300 psi to 800 psi, from 300 psi to 700 psi, from 300 psi to 600 psi, from 300 psi to 500 psi, from 300 psi to 400 psi, 400 psi to 1000 psi, from 400 psi to 900 psi, from 400 psi to 800 psi, from 400 psi to 700 psi, from 400 psi to 600 psi, from 400 psi to 500 psi, 500 psi to 1000 psi, from 500 psi to 900 psi, from 500 psi to 800 psi, from 500 psi to 700 psi, from 500 psi to 600 psi, 600 psi to 1000 psi, from 600 psi to 900 psi, from 600 psi to 800 psi, from 600 psi to 700 psi, 700 psi to 1000 psi, from 700 psi to 900 psi, from 700 psi to 800 psi, 800 psi to 1000 psi, from 800 psi to 900 psi, and from 900 psi to 1000 psi.

The method then includes providing a pressure signal to the light source 118 of each stabilizer blade 112. Providing the pressure signal to the light source 118 of each stabilizer blade 112 thereby actuates the light source 118 to produce a light beam 202. In embodiments, the control unit 400 may receive the pressure differential measured by the pressure sensor 122. The control unit 400 may then provide the pressure differential to the processor 402. The processor 402 may then transform the pressure differential into the pressure signal. The processor 402 may then provide the pressure signal to the light source 118, thereby actuating the light source. In embodiments, the light beam 202 may be of a luminous intensity sufficient to pass through the various embodiments of the lost-circulation fluid.

The method then includes allowing the light beam 202 to radiate outward from the window 120 of each stabilizer blade 112 to contact the photo-sensitive coatings 206 of the plurality of lost-circulation particles 210. Contacting the photo-sensitive coatings 206 with the light beam 210 thereby breaks the photo-sensitive coatings 206 and releases the lost-circulation additives 208 within the lost-circulation fluid.

In embodiments, contacting the photo-sensitive coatings 206 of the plurality of lost-circulation particles 210 further includes exposing the photo-sensitive coatings 206 of the plurality of lost circulation particles 210 to the light beam. The photo-sensitive coating 206 may absorb ionizing radiation from the light beam 202 when the photo-sensitive coatings 206 are exposed to or contacted by the light beam 202. The photo-sensitive coating 206 may break by photo-isomerization of the isomers that may make up the photo-sensitive coating 206. "Photo-isomerization" may refer to a chemical process where organic molecules undergo a cis-trans or trans-cis isomerization upon photoexcitation. In embodiments, photo-isomerization of polymers that make up the photo-sensitive coating 206 may lead to a structural change that thereby breaks down the photo-sensitive coating 206. For example, and not by way of limitation, cis-stilbene may be converted into trans-stilbene upon exposure to ultraviolet light. In embodiments, the photo-sensitive coating 206 may break by dissolving into the lost-circulation fluid after contacting or being exposed to the light beam 202. The photo-sensitive coating 206 may also break by degradation of the photo-sensitive coating 206 after absorption of the ionizing radiation of the light beam 202.

In embodiments, releasing the lost-circulation additives 208 within the lost-circulation fluid may increase the viscosity of the lost-circulation fluid. The lost-circulation additives 208 may increase the viscosity of the lost-circulation fluid by crosslinking the lost-circulation fluid. The lost-circulation additives 208 may also increase the viscosity of the lost-circulation fluid by the swelling of the super-absorbent polymers with the lost-circulation fluid. The lost-circulation additives 208 may also increase the viscosity of the lost-circulation fluid by the hydration of viscosifiers within the lost-circulation fluid, thereby forming a gel.

In embodiments, releasing the lost-circulation additives 208 within the lost-circulation fluid may increase the density of the lost-circulation fluid. The lost-circulation additives 208 may increase the density of the lost-circulation fluid by the hydration of the super-absorbent polymers or the hydration of viscosifiers within the lost-circulation fluid.

The method then includes allowing the lost-circulation fluid to plug the lost-circulation zone. The lost-circulation fluid may plug the lost-circulation zone by the interaction of the lost-circulation additives 208 and the lost-circulation fluid. For example, a lost-circulation fluid including amine-based crosslinkers and epoxy resin may form a settable material that decreases fluid flow into the lost-circulation zone. In another example, a lost-circulation fluid including sodium polyacrylate and water-based drilling fluid may form a plug that decreases fluid flow into the lost-circulation zone. In yet another example, the viscosifiers may viscosify the lost-circulation fluid to form a gel plug that decreases fluid flow into the lost-circulation zone.

In embodiments, the method may further include injecting a drilling fluid into the wellbore. The drilling fluid and the lost-circulation fluid may then be allowed to mix within the wellbore. In embodiments where the drilling fluid is injected into the wellbore, the drilling fluid may be injected before the lost-circulation fluid is injected. In embodiments where the drilling fluid is injected into the wellbore, the drilling fluid may be injected contemporaneously with the lost-circulation fluid. In embodiments where the drilling fluid is injected into the wellbore, the drilling fluid may be injected after the lost-circulation fluid is injected.

In embodiments including the drilling fluid, the method may include introducing the drilling fluid during the drilling operations. The method may also include measuring the pressure differential with the pressure sensor 122 during the drilling operations. The method may also include injecting the lost-circulation fluid into the wellbore after measuring the pressure differential.

In embodiments, the method may further include measuring a second pressure differential at the pressure sensor 122. The method may also include providing a second pressure signal to the light source 118 of each stabilizer blade. Providing the second pressure signal to the light source 118 of each stabilizer blade may thereby de-actuate the light source 118 to stop producing the light beam 202. In embodiments including measuring the second pressure differential, the method may also include the control unit 400 as disclosed herein. The control unit 400 may be operable to act upon the second pressure differential and the second pressure signal in a similar manner to the pressure differential and the pressure signal disclosed in previous embodiments of the control unit 400.

In the various embodiments of the system, it is contemplated that the system may be used to plug multiple lost-circulation zones. Similarly, in the various embodiments of the method, it is contemplated that the method may be used to plug multiple lost-circulation zones.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that recitations herein of "at least one" component, element, etc., should not be used to create an inference that the alternative use of the articles "a" or "an" should be limited to a single component, element, etc.

It is also noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A drilling stabilizer for plugging a lost-circulation zone in a subsurface formation, the drilling stabilizer comprising
a stabilizer body comprising a top end, a bottom end, and an outer sidewall,
stabilizer blades spaced apart from each other and attached to and extending radially from the outer sidewall of the stabilizer body, each stabilizer blade comprising a stabilizer blade body having an inner chamber, a light source positioned within the inner chamber, and a window that is at least partially transparent, and
a pressure sensor located on the outer sidewall of the stabilizer body, wherein:
the window is positioned on the stabilizer blade body to allow light from the light source to radiate from the light source positioned within the inner chamber through the window;
the light source of each stabilizer blade is actuated to generate a light beam when a pressure signal is sent from the pressure sensor; and
the light source radiates the light beam through the window of each stabilizer blade when the light source of each stabilizer blade is actuated.

2. The system of claim 1, further comprising a control unit, wherein:
the control unit is communicatively coupled to the pressure sensor and the light source;
the control unit is configured to receive a pressure differential from the pressure sensor;
the control unit is configured to transform the pressure differential from the pressure sensor into the pressure signal;
the control unit is configured to provide the pressure signal to the light source; and
the light source is actuated by the pressure signal.

3. The system of claim 1, wherein each light beam has a wavelength from 10 nm to 400 nm.

4. The system of claim 1, wherein each light beam has a different wavelength, each wavelength from 10 nm to 400 nm.

5. The system of claim 1, wherein each stabilizer blade body comprises a radial face, a leading face, a trailing face, a top face, and a bottom face.

6. The system of claim 5, wherein the window is positioned on the radial face, the leading face, the trailing face, the top face, the bottom face, or combinations thereof.

7. The system of claim 5, wherein the outer sidewall of the stabilizer body is centered about a central axis extending from the top end to the bottom end.

8. The system of claim 7, wherein the radial face is parallel to the outer sidewall of the stabilizer body.

9. The system of claim 1, wherein the pressure sensor comprises an absolute pressure sensor, a differential pressure sensor, a gauge pressure sensor, a sealed pressure sensor, or combinations thereof.

10. A method of plugging a lost-circulation zone in a subsurface formation, comprising:
introducing a drillstem comprising a drilling stabilizer into a wellbore during drilling operations, wherein:
the drilling stabilizer comprises a drilling stabilizer body, stabilizer blades, and a pressure sensor, and
the stabilizer blades each comprise a stabilizer body having an inner chamber, a light source positioned within the inner chamber, and a window that is at least partially transparent;
injecting a lost-circulation fluid into the wellbore, wherein the lost-circulation fluid comprises a plurality of lost-circulation particles, each of the lost-circulation particles comprising a lost-circulation additive encapsulated by a photo-sensitive coating;
measuring a pressure differential with the pressure sensor;
providing a pressure signal to the light source of each stabilizer blade, thereby actuating the light source to produce a light beam;
allowing the light beam to radiate outward from the window of each stabilizer blade to contact the photo-sensitive coatings of the plurality of lost-circulation particles, thereby breaking the photo-sensitive coatings and releasing the lost-circulation additives within the lost-circulation fluid; and
allowing the lost-circulation fluid to plug the lost-circulation zone.

11. The method of claim 10, wherein:
the lost-circulation additives comprise crosslinkers, acrylate polymers, super-absorbent polymers, viscosifiers, or combinations thereof; and releasing the lost-circulation additives within the lost-circulation fluid increases the viscosity of the lost-circulation fluid.

12. The method of claim 10, comprising injecting the lost-circulation fluid into the wellbore before measuring the pressure differential.

13. The method of claim 10, further comprising:
injecting a drilling fluid into the wellbore; and
allowing the drilling fluid and the lost-circulation fluid to mix within the wellbore.

14. The method of claim 13, comprising:
introducing the drilling fluid during the drilling operations;
measuring the pressure differential with the pressure sensor during the drilling operations; and
injecting the lost-circulation fluid into the wellbore after measuring the pressure differential.

15. The method of claim 10, further comprising:
measuring a second pressure differential at the pressure sensor; and
providing a second pressure signal to the light source of each stabilizer blade, thereby de-actuating the light source to stop producing the light beam.

16. The method of claim 10, wherein contacting the photo-sensitive coatings of the plurality of lost-circulation particles further comprises exposing the photo sensitive coatings of the plurality of lost circulation particles to the light beam.

17. The method of claim 10, wherein each light beam has a wavelength from 10 nm to 400 nm.

18. The method of claim 10, wherein the pressure differential is caused by a lost-circulation zone event.

19. The method of claim 10, wherein the photo-sensitive coating comprises photolabile crosslinked polymers, chain scission reaction polymers, photodegradable pendant group polymers, or combinations thereof.

20. The method of claim 10, further comprising a control unit, wherein:
the control unit is communicatively coupled to the pressure sensor and the light source;
the control unit is configured to receive a pressure differential from the pressure sensor;
the control unit is configured to transform the pressure differential from the pressure sensor into the pressure signal;
the control unit is configured to provide the pressure signal to the light source; and
the light source is actuated by the pressure signal.

* * * * *